United States Patent [19]

Browning

[11] Patent Number: 5,805,870
[45] Date of Patent: Sep. 8, 1998

[54] SYSTEM AND METHOD FOR CORRECTING CLOCK DRIFT IN MULTIPROCESSOR SYSTEMS

[75] Inventor: Luke Matthew Browning, Austin, Tex.

[73] Assignee: International Business Machines Corporation, Armonk, N.Y.

[21] Appl. No.: 672,885

[22] Filed: Jun. 28, 1996

[51] Int. Cl.⁶ .................................................. G06F 1/12
[52] U.S. Cl. ............................................................ 395/553
[58] Field of Search ............................................. 395/553

[56] References Cited

U.S. PATENT DOCUMENTS

| 5,041,966 | 8/1991 | Nakai et al. | 395/553 |
| 5,131,084 | 7/1992 | Kasashima et al. | 395/553 |
| 5,228,138 | 7/1993 | Pratt et al. | 395/552 |
| 5,392,421 | 2/1995 | Lennartsson | 395/551 |
| 5,572,554 | 11/1996 | Heflin | 375/556 |

Primary Examiner—Thomas M. Heckler
Attorney, Agent, or Firm—Robert M. Carwell

[57] ABSTRACT

Each processor in a multiprocessor system has a local clock. Variables "TIME_DELTA" and "TIME_PREV", are defined for each processor and maintained in databases. TIME_DELTA is decremented or incremented to zero, dependent upon whether a positive or negative time delta is specified by the user, and is modified at each clock tick. TIME_PREV represents the time to bring the current processor up to the remaining processors' time. A user-specified time adjustment causes an ADJTIME system call. When a second ADJTIME call is subsequently made responsive to a next adjustment, the system examines each processor's TIME_DELTA and determines which processor has advanced the furthest and calculates the time for each processor to catch up with this most-advanced processor. This time value is thereafter stored in the TIME_PREV field and applied at the next system clock tick. Finally, the ADJTIME call updates each processor's TIME_DELTA with the new value as specified by the user. Updates to the clock are thus maintained on a per clock tick basis.

24 Claims, 5 Drawing Sheets

FIG. 5

SYSTEM AND METHOD FOR CORRECTING CLOCK DRIFT IN MULTIPROCESSOR SYSTEMS

TECHNICAL FIELD

This invention relates to techniques for maintaining accurate time on multiprocessor systems and, more particularly, relates to systems and methods for synchronizing controllable clock circuits for use with corresponding coupled processors in distributed systems.

BACKGROUND OF THE INVENTION

First, a specific discussion of the problem addressed by the invention is provided, followed by a more general discussion and summary of alternative solutions which have been proposed.

In multiprocessor (MP) systems, a mechanism must be provided for facilitating each processor's ability to read time efficiently. This is because in such environments timestamping is employed extensively for validation of data, security purposes, various protocols employed in networks, and the like.

Simpler systems conventionally had provided a single clock chip for the entire system. However, the drawbacks to this simple approach soon became readily apparent in requiring each micro processor to gain access to the single clock by arbitrating over the bus, thereby leading to synchronization problems and attendant delays.

Thus the distinct advantages of multiple clocks and permitting each microprocessor to read time from its local clock eventually became apparent.

These multiclock, MP systems, however, were not without their own drawbacks. Particularly in distributed systems, the importance of maintaining a common time over the network of machines was well known. As may be readily appreciated, with the presence of multiple clocks, the problem of clock drift and updating clock times can be exacerbated by the multiple clocks in the system. Accordingly, sophisticated systems and software controls developed both in order to broadcast time to particular systems on the net which were drifting backwards or forwards in order to update their time, as well as to determine how best to maintain time between processors on a network-wide basis. These various clocks were in need of being updated both for internal reasons and for reasons external to the system.

In such MP systems, facility is generally designed in to allow user-made decisions about updating clock time which obviously must be propagated to all clocks in the system. A user was thus permitted to specify time adjustments which, could in some cases easily be in the range of hours. However, these time adjustments typically were made by only applying a small fraction of the adjustment at each clock tick, for reasons to be hereinafter detailed. Thus the system could easily take a very long time to complete such time corrections which had to be processed in some manner uniformly for each processor's clock chip. This then became generally the problem plaguing some MP systems, namely how to update multiple clocks in an MP system once a request has been received over the network to do so.

During the interval in which such a correction is to take place, the original system call or request to adjust time ("ADJTIME") could of course be superseded with a new ADJTIME request. This in turn poses a problem to be hereinafter described in greater detail for such MP systems having multiple clocks inasmuch as it is conventional not to update all clocks at the same time. One reason for this is that a database must be maintained in the system for managing the multiple clocks. Accordingly multiprocessor locking constraints are required for accessing the database. The system timer for each processor is therefore conventionally scheduled to occur at slightly different times in order to minimize unnecessary lock contention. The TIME_DELTA to be applied by reason of the time adjustment system call is a global data structure, and thus it was well known that multiprocessor systems had to protect such global data structures with the aforementioned locks.

For various reasons including the fact that applications typically must see positive progression of time in subsequent transactions, "negative" system time adjustments or deltas are conventionally handled as follows. An ADJTIME system call will make adjustments to system time by incrementing a given clock but at a slower rate than for other clocks to thereby effectively slow the given clock relative to the others. Conversely, if the delta is positive (e.g., it is desired to speed up a given clock relative to others), the clock in question will be made to simply advance faster than normal. The delta to be applied will be distributed over multiple clock ticks, with corrections at each clock tick being a fraction of 1% of a second for example in a system in which system time is updated 100 times a second. Thus, in this manner, time is seen as always advancing from one clock tick to another but at different rates as required, depending upon the particular clock and the necessary adjustment specified by the user.

However, because noted clocks cannot be updated at the same time and intervening requests can occur, if a processor "A" updates its clock at a faster rate and an intervening call to ADJTIME thereafter occurs before processor "B" complete updates to its clock, the individual clocks associated with each multiprocessor may therefore be applying differing deltas. In other words the time on processor "A" could be advancing at a different rate from that on processor "B".

Some systems have provided actually for differing predetermined magnitudes of adjustment to accommodate potentially wide variations in desired deltas. Thus, in one such system, if the requested total adjustment is greater than one second as an example, time might be made to advance 50% faster than normal with the clock advancing $15/1000$ of a second at each clock tick (because, as aforementioned, the system under consideration operates on 100 clock ticks per second). Otherwise, in providing another rate of adjustment, time might be configured in the system to advance only 10% faster than normal with $11/1000$ of a second being applied at each clock tick. Similarly, if a negative time adjustment is specified by the user, time might be adjusted to advance 10% slower than normal.

Although the magnitude of adjustment for a given clock tick might appear to be relatively insignificant, for reasons that will be hereinafter apparent, the aforementioned problem of processors in a multiprocessor system having clocks advancing at different rates can result in large relative differences in time between respective clocks of two as seen multiprocessors in the system which might be several minutes apart or worse. This in turn poses significant problems for systems which have time finely integrated into their algorithms, as is commonly done in distributed systems in the form of timestamping. In such systems, to illustrate the problem, if a message is deemed to be too old as a result of the timestamping, communication between two machines can become difficult to the point that it may even be disabled between the machines due to this relative clock drift. This problem is not only limited to multiprocessor networks, but may also surface in standalone systems because, for example, an application on such as system may run on different processors in the course of its execution. However the time within such a system must itself be consistent, or otherwise the same types of data integrity problems hereinbefore noted may occur.

A solution to the foregoing problems had eluded the industry and was highly sought after in order to ensure that once a processor in a multiprocessor system has been updated, that the corresponding update be applied to the remaining processors in the system uniformly, regardless of intervening ADJTIME system calls.

Until the subject invention, the cause of the problem thereby addressed was not even recognized generally in the industry. First, prior systems did not keep track of parameters such as TIME_PREVIOUS to be hereinafter described, whereby different rates of correction for each processor could be kept track of and changed. Rather, simpler systems, in response to, say, a user-specified clock update from 10 seconds to 0.05 seconds would simply incrementally apply this change without recognizing the history of prior updates, e.g., the fact that a change had not been propagated to all clock in the system. This simplistic approach appeared reasonably satisfactory in simpler systems.

However, with the advent of more complex distributed systems such as the distributed computing environment (DCE) well known in the art, significant inexplicable timing problems began to manifest themselves. In such an environment, distributed applications are executed with many machines in a net with, for example, client-server daemons in need of sharing the same time in sending requests back and forth as part of a trusted domain. One problem with lack of integrity and drift clock in time is that this frequently would result in failed requests. With respect to DCE systems in particular, time validating protocols are extensively employed and in stressed implementations of such systems it began to be noticed that daemons were experiencing difficulty in communicating in that requests were not being serviced in time. It was well known in the art that such problems could occur on a system-to-system basis, giving rise to these failures in communication. However, the industry, until advent of the subject invention, did not recognize that timing inconsistencies were occurring within a given system due to defective mechanisms for updating the multiple system clocks of an MP system—a problem addressed by the instant invention.

One reason why the problems did not manifest themselves until recently is that heretofore multiprocessor systems with multiple clocks were not being employed in stressful environments wherein the systems were being inundated with timing adjustment request. Such is the case in the aforementioned DCE systems, in which, for example, instances were encountered wherein the entire system would stall out. The problem was particularly exasperating and the solution elusive in that the program code for such systems typically would pass numerous standards and stress test suites suggesting there was no problem with the program code per se. However, given the nature of such systems, time adjustments were being applied perhaps thousands of times a second stressing the system while the cause of the problem was going unrecognized.

In such systems where there may be thousands of intervening time adjustment system calls, cumulatively the problems associated with coherent adjustment of system clocks can become extreme, notwithstanding that for a given adjustment a minute amount of time is involved. With modern systems executing with such performance that calls may be executed thousands of times in a small amount of time, by not applying the uniform adjustment in time evenly across all multiple processors and their clocks severe problems may arise.

For example, a large tick adjustment may occur with respect to processor A, followed by an intervening system call to reset it to a negative value. This negative time adjustment might otherwise be applied to processor B, which as yet had not applied processor A's large tick adjustment. The net result would be a large essentially positive time adjustment to the A processor's clock and a small negative adjustment to the B processor's clock, resulting in the clocks moving in opposite directions. Given the speed of modern systems, it can be readily appreciated that drift in the relative times of the clocks for each processor might result in severe discrepancies in relatively short periods of time. In other words, if an intervening system call arrives reflecting a user desiring to apply a different time value but the system clock control mechanism has already updated only some of the processors, the result is that we have a pending request that needs to be applied only to certain of the processors in order to have the same set of deltas being applied uniformly. Making such adjustments obviously must take a fair amount of time to effect incrementally and the system cannot simply be shut down in order to effect a large adjustment although even this undesirable approach has been attempted in previous systems.

In an effort to address the hereinbefore noted problems of network request failures, data failing to be committed to databases correctly (because of the aforementioned clock problems and requests for data before the data is timestamped and validated), etc, several approaches were attempted. One such approach is to simply stop all clocks at the same time to perform processor-to-processor arbitration while all the processor clocks are stopped. However, this approach has several drawbacks and is limited as a hardware solution only to certain systems having the necessary hardware support for stopping all processor clocks. Moreover, the process is very slow, entailing arbitration instructions over the bus. Obviously such an approach is not useful in multiprocessor systems having no way to update another system's processors and all its clocks. The approach would be feasible in some instances in which there was essentially one clock or shadowed clock for the entire system but would not be applicable to systems of the invention in which individual processor clocks must be updated on a per processor basis, giving rise to the necessity addressed by the invention of keeping track on a per processor basis of each processor's clock.

There are numerous additional drawbacks to requiring updating of clocks in a synchronous fashion not the least of which is performance degradation inasmuch as it is an expensive operation performance-wise to serialize all the reading and changing of a single clock. Such a clock could obviously be read by any processor at the same time but in order to update the clock time it would obviously be necessary to lock out reads to others of the processors during the update. Moreover, the interface to the single clock chip would of necessity be greatly complicated by the need for its being referenced by perhaps thousands of processors in a complex system.

In summary, then, regarding synchronous adjustments to clocks, this approach is possible in limited instances, wherein the adjustment is made to all processors at the same time with the downside that the system must await completion of this task. The most obvious example perhaps in a UNIX environment is the case of a super user who may certainly globally update a time without waiting for it to be applied over a time interval. However, such a user may not know or even care about potential adverse ramifications in the operation of software on the network by doing so or may simply assume a risk not desired by other users of the system.

Another approach to solving the problems herein presented was by simply precluding intervening system calls from changing clock times in order to avoid the problem of having applied a time delta to only a portion of the processors before servicing the intervening call for a change to a different time correction rate. In other words, in this approach, all new time correction requests from users would be held in abeyance until the same prior time delta had been applied to all processors.

Several serious drawbacks present themselves with such an approach. Not the least of these, is that an extensive amount of synchronization is required by such an approach. A current request would have to be held in abeyance by causing the request to spin until other clocks in the system all had their time deltas applied, whereupon the new time delta value could then be applied.

Significant performance degradation results from the foregoing system wherein facility is not provided for time correction on a per processor basis. Moreover, in such a system, after performing updates relative to all of the processors but one, there is nothing to prevent the remaining processor from interrupting on the next clock tick to apply the next time delta since each processor is being updated independently. Updates do not necessarily occur exactly at the prescribed intervals (such as 0.01 seconds) because the code making the update is driven by the clock itself which occurs only at particular interrupt levels. Accordingly, significant interrupt activity could occur in systems having higher priorities than that of the clock which will be processed first. Thus, in such a system if an attempt is being made to synchronize clock updates at a system level which is waiting for all processors to apply a series of updates uniformly, when this is effected with respect to the last processor, the first processor could be interrupting again, whereupon closure may never be reached.

SUMMARY OF THE INVENTION

A multiprocessor system is provided in which each processor has associated therewith a local clock. Two variables "TIME_DELTA" and "TIME_PREV", are defined for each such processor in the system and maintained in databases. The TIME_DELTA variable is decremented or incremented to zero, dependent upon whether a positive or negative time delta is specified by the user, and is modified at each clock tick of the system. The TIME_PREV variable represents the amount of time needed to be applied to bring the current processor up to the same time as the remaining processors in the system. A user specifies a desired time adjustment in the system causing an ADJTIME system call to be made. When a second such ADJTIME call is subsequently made responsive to a next desired time adjustment, the system of the invention examines each processor's TIME_DELTA field in the database and determines which processor in the multiprocessor system has advanced the furthest in time. The system thereafter calculates the time needed for each processor of the system to catch up with this most-advanced processor. This time value to catch up each such processor is thereafter stored in the TIME_PREV field in the database and is applied in its entirety in the next occurrence of the system clock tick. Finally, the ADJTIME call updates each processor's TIME_DELTA value in the database with the new value as specified by the user. In this manner updates to the clock are maintained on a per clock tick basis and are not lost.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying figures, wherein:

DETAILED DESCRIPTION OF THE PREFERRED EMBODIMENT

Figure 1:
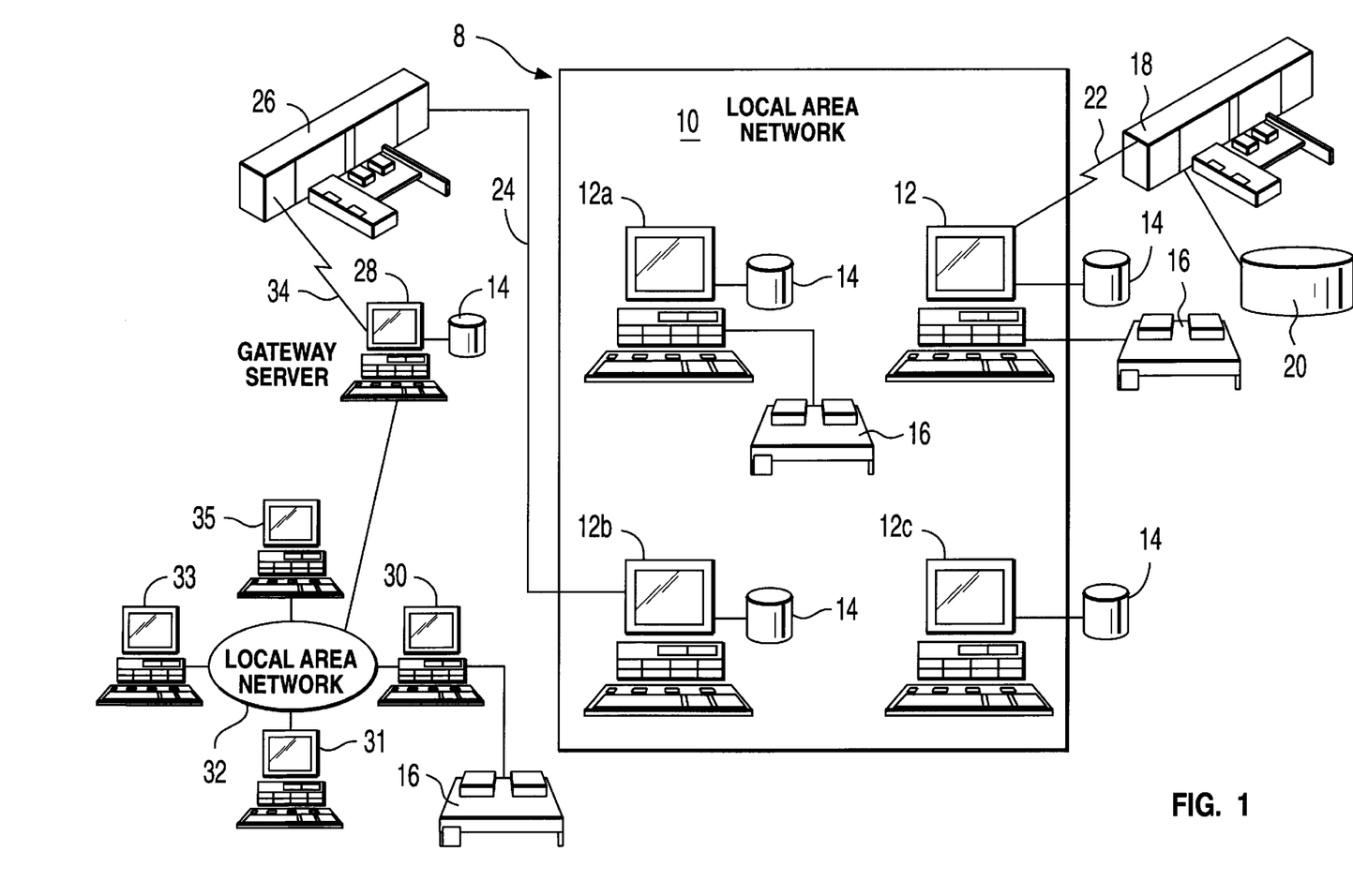
FIG. 1 is a block diagram illustrating a multiprocessor system in the form of a network in which the invention is advantageously employed.

First a network environment will be described with reference to FIG. 1 in which the clock drift correcting system of the present invention may be advantageously employed in such a multiprocessor system as depicted in FIG. 1. This will be turn be followed by a more detailed description of a representative computer which may comprise one of the computers of the network system shown in FIG. 1.

Figure 3:
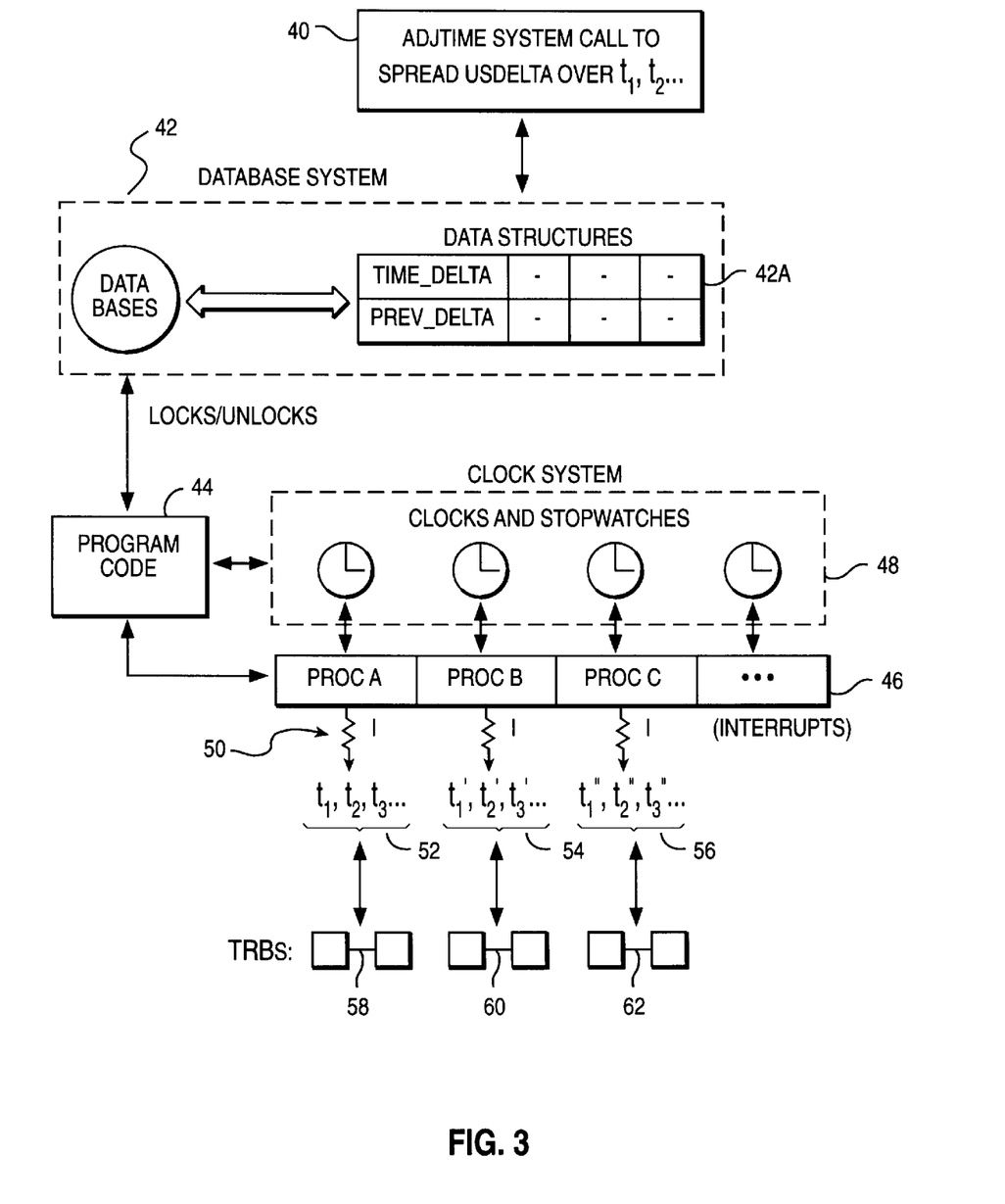
FIG. 3 is a pictorial illustration of functional components of the system of the invention.

Next, the functional components of the invention and their interaction as illustrated in FIG. 3 will be described in greater detail. This will be followed by a description of a representative implementation of program code depicted in the flow diagram of FIG. 4 for processing an ADJTIME system call. Finally with reference to FIG. 5, a detailed description of the flow diagram depicted therein will be provided which describes how the time is adjusted in the system of FIG. 1 in accordance with the invention in order to maintain accurate time on all of the processors in the multiprocessor system.

With reference to FIG. 1, there is depicted a pictorial representation of a data processing system 8 which may be utilized to implement a method and system of the present invention. As may be seen, data processing system 8 may include one or more networks, such as local area networks (LAN) 10 and 32, each of which preferably includes a plurality of individual computers 12, 12a–12c, 30, 31, 33 and 35. (Hereafter, when discussing a computer in network 32, a computer 30 will be arbitrarily referenced, although the discussion could relate to any of the computers in network 32). Computers 12 and 30 may be implemented utilizing any suitable computer such as the IBM Personal System/2 (also called a "PS/2") computer or an IBM RISC SYSTEM/6000 computer, both products of International Business Machines corporation, located in Armonk, N.Y. ("RISC SYSTEM/

6000" is a trademark of International Business Machines Corporation, "Personal System/2" and "PS/2" are registered trademarks of International Business Machines Corporation). Of course, those skilled in the art will appreciate that a plurality of intelligent work stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store objects, such as documents, resource objects, or executable code, which may be periodically accessed by any user within data processing system 8. In a manner well known in the prior art, each such object stored within a storage device 14 may be freely interchanged throughout data processing system 8 by transferring an object to a user at an individual computer 12 or 30, for example.

Still referring to FIG. 1, it may be seen that data processing system 8 also may include multiple mainframe computers, such as mainframe computer 18, which may be preferably coupled to LAN 10 by means of communications link 22. Mainframe computer 18 may be implemented utilizing an Enterprise Systems Architecture/370 (also called an "ESA/370") or an Enterprise Systems Architecture/390 (also called an "ESA/390") computer available from IBM. Depending on the application a mid-range computer, such as an Application System/400 (also called an "AS/400"), may be employed. "Enterprise Systems Architecture/370", "ESA/370", "Enterprise Systems Architecture/370", and "ESA/390" are trademarks of IBM; "Application System/400" and "AS/400" are registered trademarks of IBM; "Application System/400" and "AS/400" are registered trademarks of IBM. Mainframe computer 18 also may be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

As discussed above with respect to LAN 32 and LAN 10, objects may be stored within storage device 20 and controlled by mainframe computer 18, as Resource Manager or File System Manager for the stored objects. Of course, those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within Texas and mainframe computer 18 may be located in New York.

Figure 2:
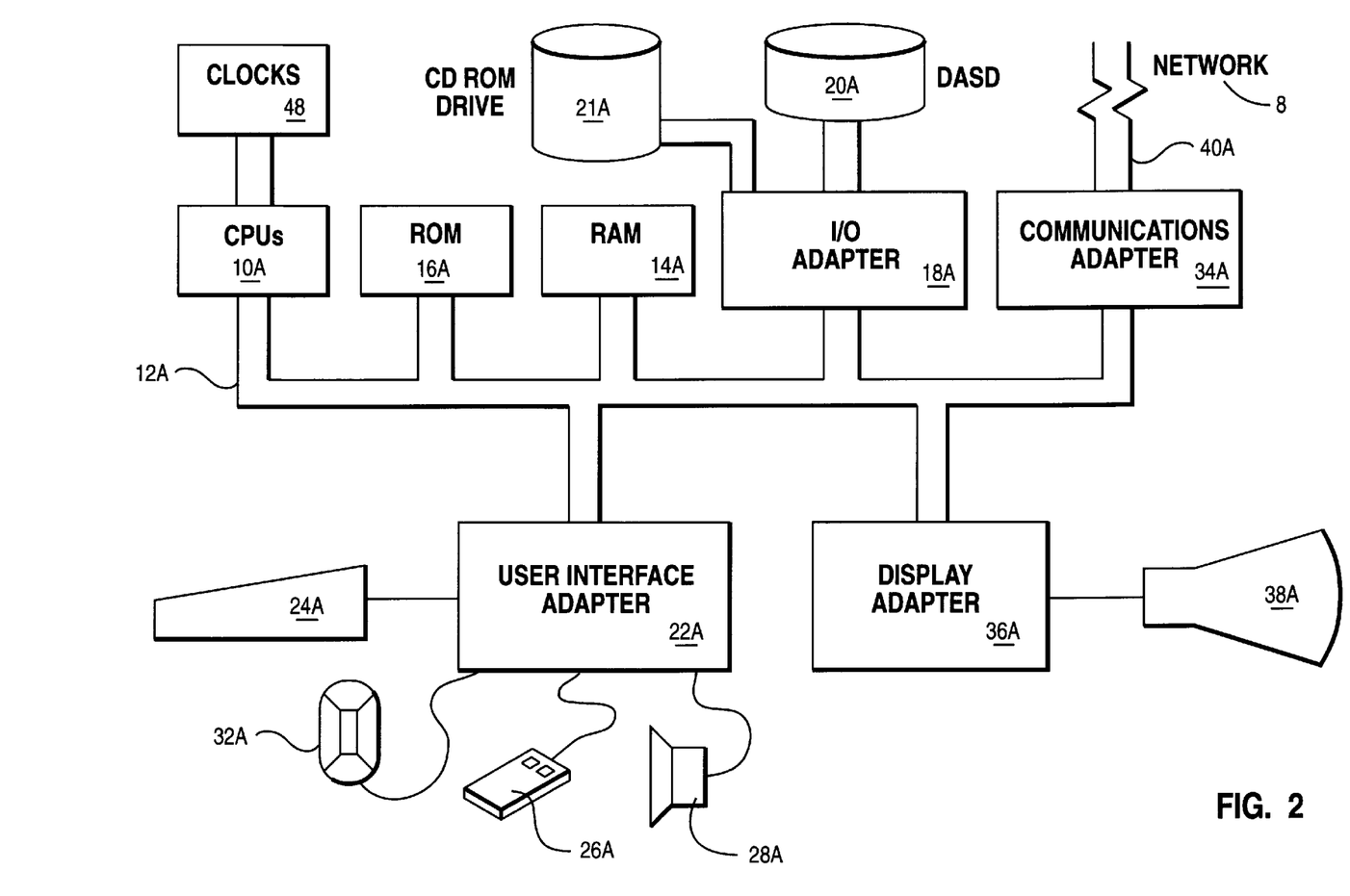
FIG. 2 is a more detailed block diagram of one of the computers comprising the network of FIG. 1.

Referring now to FIG. 2, a more detailed representation of one of the computers such as computer 12 of the system 8 of FIG. 1 is provided.

The system includes one or more multiprocessor computers, each comprised of multiple CPUs 10A, read only memory (ROM) 16A, random access memory (RAM) 14A, I/O adapter 18A, user interface adapter 22A, communications adapter 34A, and display adapter 36A, all interconnected via a common address/data/and control path or bus 12A. Each of the above components accesses the common bus utilizing conventional techniques known to those of ordinary skill in the art, and includes such methods as dedicating particular address ranges to each component in the system, with one of the CPUs being the busmaster for example. Other conventional techniques known to those of ordinary skill in the art employed in the system of FIG. 2 include direct memory access (DMA) used to transfer data at high speed from external devices such as DASD 20A or the network or the network shown to the data processing systems's RAM 14A. As is further shown in FIG. 2, these external devices such as DASD 20A and CD ROM drive 21A interface to a common bus 12A through respective adapters such as I/O adapter 18A. Other external devices, such as the display 38A similarly use their respective adapter such as display adapter 36A to provide data flow between the bus 12A and the display 38A or other device. Various user interface means are provided for interconnection and use with the user interface adapter 22A which, in the figure, has attached thereto representative user input devices such as a joy stick 32A, mouse 26A, keyboard 24A, and speaker 28A. Each of these units is well known as such and accordingly will not be described in detail herein.

The invention admits to implementation on many different MP systems such as the RS/6000 (TM), workstations of the IBM Corporation executing the AIX (TM), OS/2 (TM), supporting MP platforms or other appropriate operating system(s) either alone or together in a LAN or other network, or similar machines of other vendors either standalone or in networks and executing one or more such operating systems.

Each such computer will preferably have, in accordance with the invention, at least two storage devices. The first (such as drive 21A) will preferably have the characteristic that it includes easily readable and removable media (such as a CD, tape, etc.) and that such media will store portions of code (such as operating system parts) which the user typically would not have a need or desire to alter or have a local copy of. Such media may, from time to time, also include yet other code which, in fact, may be desirable to download onto the client's hard drive(s) because it is pertinent essentially only to particular client(s) and not generic to operation of clients generally on the network.

The second storage device (such as DASD 20A or other form of hard drive(s), etc.) would be intended to store local, user customizable files and thus, unlike the first storage system, must be writable.

Although in a typical embodiment of the invention, a CD ROM drive, and hard drive with operating system components stored on a CD are depicted, the invention is not intended to be so limited just to operating system code being the code remaining on the first storage or even that the first storage and second storage only be limited to a CD ROM drive and hard drive, respectively. Thus, code other than operating system code may have components and aspects requiring installation of portions thereof and modification of the hard drive(s) and other components and aspects generic to multiple clients and the network which would remain solely on the CD or read-only media and not require modification of the hard drive(s). Moreover, the CD ROM drive could take the form essentially of any storage device wherein writes from the client are not normally encountered or required. Thus the reference to a "CD ROM" client is for convenience and not intended to be limiting in any way. Similarly the hard drive could be any of a number of devices permitting writes by the client.

In the example being illustrated, it is assumed that clock ticks occur every 0.01 seconds. It is further assumed that a correction of 0.015 seconds is made on each clock tick at a maximum rate of 150% of the clock interval. As will be hereinafter noted in accordance with good system design, the invention admits to providing for different rates of adjustment, depending for example on the magnitude of the TIME_DELTA which is in need of adjustment. In the present case in which a large adjustment of 10 seconds is required, the relatively large 150% rate may be selected. Conversely, slower rates of adjustment may be selected as desired.

Turning now to FIG. 3, it will be helpful to first provide a specific example of how time may be updated in accordance with the invention before describing the particulars of the figure. It will be recalled that typically a user may specify a time adjustment which will be propagated to the various clocks of the processors by means of the aforementioned ADJTIME system calls. In the example which follows, it will therefore be assumed that such a user has caused the issuance of an ADJTIME call, specifying that the multiprocessor system should be updated by 10 seconds.

From the foregoing it will be recalled that a database system is provided which, in part, is employed to maintain two variables for each processor in the system, namely the TIME_DELTA and TIME_PREV variables. As will be hereinafter described with reference to the specific example, the TIME_DELTA variable will be decremented or incremented to zero (dependent upon whether a positive or negative time delta was specified by the user) and is modified at each clock tick. In the example under consideration, the time delta will be decremented because the user has specified a desire to update the time by 10 seconds. It will further be recalled that the TIME_PREV variable is the amount of time which needs to be applied in order to bring the current processor up to the same time as the others in the system.

At the occurrence of the first ADJTIME call, data structures stored in an appropriate database will be updated in the following manner in accordance with Table 1:

TABLE 1

| | TIME_DELTA | TIME_PREV |
|---|---|---|
| PROCESSOR A | 10 SECS | 0 |
| PROCESSOR B | 10 SECS | 0 |
| PROCESSOR C | 10 SECS | 0 |

After one clock tick, each processor in the system (for simplicity assumed to be processor A, B, and C) may have the states represented in the following table and reflected in the database:

TABLE 2

| | TIME_DELTA | TIME_PREV |
|---|---|---|
| PROCESSOR A | 9.985 SECS | 0 |
| PROCESSOR B | 10 SECS | 0 |
| PROCESSOR C | 10 SECS | 0 |

As previously described, when an intervening next ADJTIME call is made (such as a time adjust specified by the user to scale back cumulative time adjustments to 0.05 seconds rather than 10 seconds) the system of the invention will examine each processor's TIME_DELTA field in the database to determine which processor had already been advanced the furthest. In the illustration under consideration, in Table 2, this will be the first entry, e.g., the processor A which may have been adjusted to 9.985 seconds (e.g., 10-0.015). The system will then determine the amount of time needed for each other processor (e.g., processor B and processor C) to catch up with this most advanced processor A. This value will then be placed in the TIME_PREV field and will be applied in its entirety to the next clock tick. Finally, the ADJTIME call will update each processor's TIME_DELTA with the new value as specified by the user.

Thus, after the intervening ADJTIME call wherein the time was adjusted to scale back to 0.05 seconds, the processors A, B, C, in the illustrative simplified system may thereby have the state as represented in the following Table 3.

TABLE 3

| | TIME_DELTA | TIME_PREV |
|---|---|---|
| PROCESSOR A | .05 SECS | 0 |
| PROCESSOR B | .05 SECS | .015 SECS |
| PROCESSOR C | .05 SECS | .015 SECS |

It will be noted that the TIME_DELTA for each processor A, B, C, in Table 3 as reflected in the database will now have been changed from the previous 10 seconds to the 0.05 seconds specified in the intervening ADJTIME call invoked by the user who has altered the previously specified time update of 10 seconds.

More importantly, however, though, comparing the TIME_DELTA in Table 2 of processor A to that of processor B and C, it will be noted that the system will calculate the time needed for processors B and C to catch up with the most advanced processor A. This time will be determined to be, in the example, (10-9.985 seconds) or in other words a TIME_PREV of 0.015 seconds required by each processor B and C to catch up to the 9.985 second of processor A shown in Table 2. This value of 0.015 may be seen to have been placed in the TIME_PREV field in Table 3 for processors B and C and reflected in the database. Additionally, each processor's TIME_DELTA has also been updated in Table 3 to reflect this new value specified by the user of 0.05 seconds. These values in Table 3 are thereafter used in a subsequent intervening ADJTIME system call so that the clocks of each processor may be maintained on a per clock basis throughout all of the processors' clocks in the system without being lost. It will be noted that the TIME_PREV for processor A is zero whereas it is 0.015 seconds for processors B and C because processor A's clock was updated by 0.015 on the clock tick preceding the new rate specified by the user of 0.05 whereas processors B and C had not been so updated yet by the time the intervening amount of 0.05 seconds had been specified in the intervening ADJTIME call.

Turning now to FIG. 3, a functional block diagram is shown illustrating the invention and two aspects in particular—namely the ADJTIME system call 40 which specifies time adjustment requests from the user to the system, and the program code 44 which is executed on a per processor basis to implement these time changes in the plurality of processors' respective clocks. Also an important aspect of the invention illustrated is the interaction between this system call and the program code 44 employing a database system 42. The database system is maintained for, among other things, storing how much time has been applied and the amount of time adjustment to apply per tick on a per processor basis in order that the time adjustments may be made coherently system wide in a uniform fashion.

The figure further illustrates that in the system of the invention, multiple processors A, B, C . . . 46 are provided forming an MP system, each with a separate clock and stopwatch shown collectively as reference numeral 48. The program code 44 includes interrupt driven code driven by the clocks themselves which are programmed to interrupt the processors 48 shown by the interrupts "I", 50, at particular times. As will be hereinafter described, code executing at a given instant will obtain a global lock which is shared by all processors 46 in locking the database 42.

Also shown in FIG. 3 are a series of timer request blocks 58, 60, 62 . . . which in part perform the function of enabling the programming of clocks 48 for particular respective ones of the processors 46 to generate interrupts employing the database 42 at specific times. These timer request block (TRB) can be rescheduled by any processor 46 on the system to start and stop. The important point though is that by use of the database 42 these request operations to interrupt at particular times are linked together with respect to each of the processors. From a hardware point of view, these TRBs 58–62 may be seen to essentially be providing scheduled interrupts 50 to interrupt the processors 46 at slightly varying intervals. It will be recalled that each processor will have a series of clock interrupts initiated by the clock ticks such as $t_1-t_3$ (reference numeral 52) for processor A, $t'_1-t'_3$ (reference numeral 54) for processor B, etc.

It is important to note that the series of times 52–56 are staggered. More particularly, a given clock interrupt such as $t1$, $t'_1$, and $t''_1$ are staggered from each other so that they occur perhaps nanoseconds apart, $t_1$, $t'_1$, $t''_1$. Otherwise lock contention may result. For example, if processor A is holding a lock on the database 42 and the clock interrupt associated with $t'_1$ occurs too quickly thereafter, causing an attempt by processor B to grab the lock before processor A is through with database operations, processor B will thus start spinning on the lock, thereby generating undesirable bus activity and precluding performance of meaningful work. It will be appreciated that with clock ticks coming in perhaps at a rate of 0.01 times per second, significant overhead might otherwise be added to the system from idle spin loops. This then explains the presence of scheduled interrupts 50 and the employing of the TRBs to interrupt processors 46 at slightly different intervals.

In summary, each processor 46 at appropriate times dictated by the interrupts and the TRBs, obtains a lock on the database, and applies a common algorithm to reference data structures 42A.

Continuing with FIG. 3, the data structures 42 will be described in greater detail. Fundamentally two components will be provided, already described with reference to the specific example, namely a TIME_DELTA shown in the upper row and a previous delta (PREV_DELTA) shown in the lower row of database 42A. Until a user request (USDELTA) specifying a time adjustment represented by system call 40 occurs, values will of course be zero inasmuch as there is no USDELTA to be applied at the sequence of time intervals. When such a request is made, however, the database 42 is set from this specified time delta and protected in the manner described with the global locking mechanism. It will be noted that interrupts 50 and clock ticks 52–56 will continue to occur independent of setting the clocks 48 because system-type functions nevertheless will continue to be performed at regularly scheduled intervals, such as sampling for statistics and time scheduling/sharing.

In rewriting the various processors' registers, it will be recalled that the database system 42 is locked periodically inasmuch as the times "t" are occurring at slightly different intervals. If the processor A register is being updated due to a $t_1$ interrupt, without such locking a new request to change the updating from, for example, 10 seconds to 9 seconds, (such requests occurring from different programs for example) could occur at the same time. Global locking is provided referenced both on a system level and per processor basis, and proper maintenance of the database thereby precludes the aforementioned contention problems. Thus, an interrupt 50 may cause program code 44 to execute at a time $t_1$ which, after completion, will allow the system to return to its previous state and to permit subsequent interrupt to now be scheduled to take place employing the TRBs to execute the same code and update the database 42 without contention.

It will be noted that each of the plurality of "clocks" in the clock complex 48 is actually comprised of two components, e.g., the clock for each processor and corresponding stopwatch. Each such stopwatch generates a countdown (in the specific embodiment herein described every 0.01 seconds) on a per processor basis. Each time the stopwatch countdown occurs, an interrupt 50 is generated causing execution of a clock interrupt handler which, in response thereto, examines memory at a fixed location and determines the appropriate program code 40 to be called, and the appropriate functions to measure the clock and apply updates as required. Also, as aforementioned, upon occurrence of an interrupt, the system will in a conventional manner sample for statistics, time sharing, etc., and when these processes are completed, the corresponding stopwatch giving rise thereto will be reset so as to go off at the next time $t_2$ in the case of processor A, $t'_2$ in the case of processor B, whereupon these processes are repeated.

Figure 4:
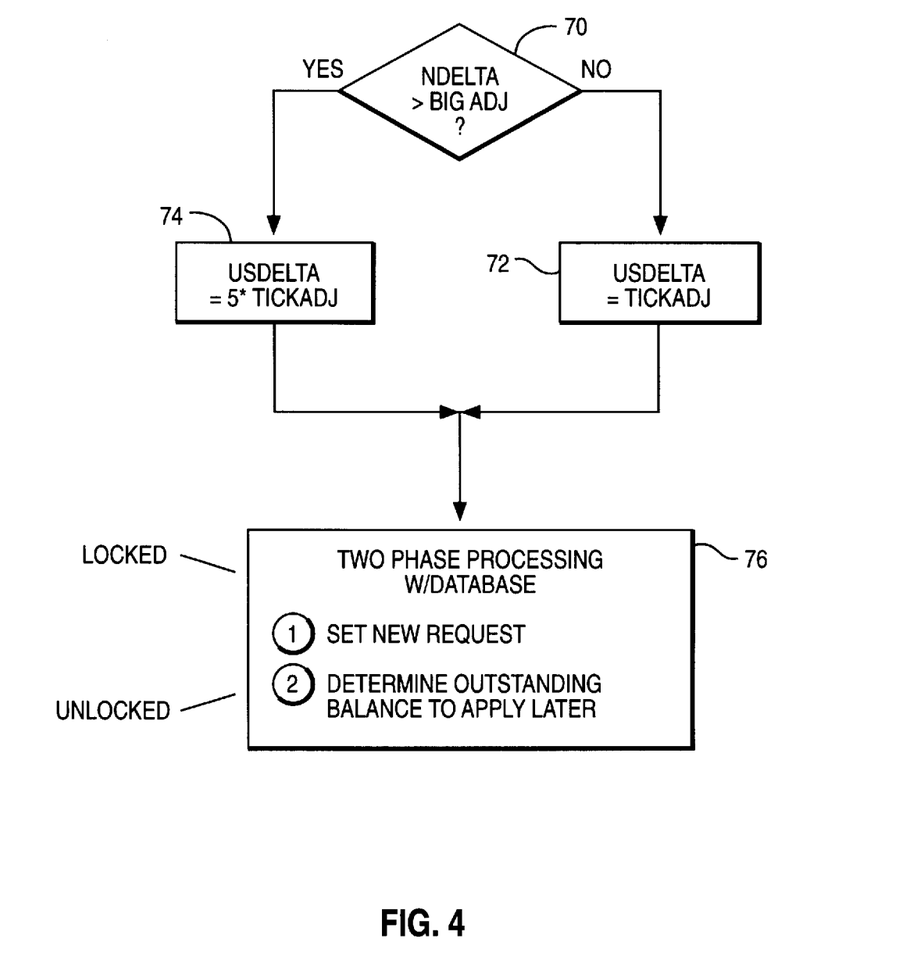
FIG. 4 is a flow diagram illustrating operation of program code for processing the system request to update system time.
Figure 5:
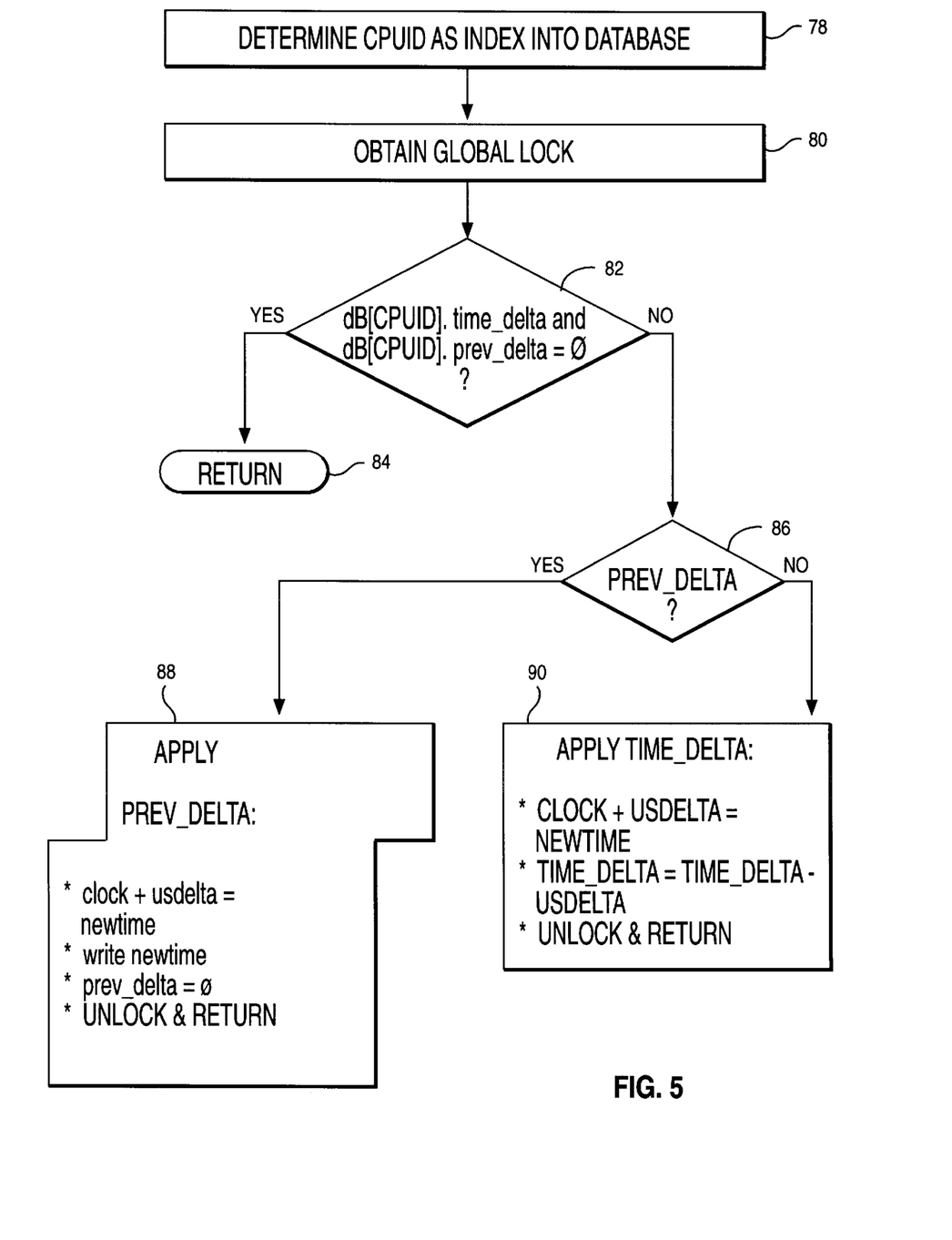
FIG. 5 is a flow diagram illustrating the operation of program code in response to the system request implemented by the program code of FIG. 4 in order to effect the requested system time update.

Turning now to the flow diagrams of FIGS. 4 and 5, operation of the system of the invention may be thought of in two phases. First, functionality must be provided as represented in FIG. 4 for handling the system call itself from the user, specifying the adjustment in time to be made to the system in updating the clocks. In response to handling this system call, additional program code and functionality represented in FIG. 5 is employed to perform the actual updates (e.g., the ADJTIME function) on a per processor basis.

In the specific embodiment herein described, for reasons mentioned it may be desirable to provide for more than one rate of adjustment, e.g., in the illustration a large rate and a small rate for clock adjustment. Accordingly, a first decision box 70 is provided for detecting in response to user input whether a desired change in the clock (NDELTA) exceeds a selected threshold (BIGADJUSTMENT). If so, the sequential adjustments in clock time will be magnified by a factor such as 5. Thus, as shown in block 74, the user selected time adjustment will be set at a multiple of the tick adjustment time such as 5*TICKADJ. Otherwise, if the new delta time does not exceed this preselected BIGADJUSTMENT threshold, the process exits to the right of block 70, whereupon the USDELTA is considered to be set equal to the TICKADJ, shown at block 72.

Continuing with FIG. 4, in either event, the program code 44 represented in FIG. 3 for handling the system call will then execute two phases, namely to first set the database 42 for the new request and to determine the outstanding remaining balance of time adjustment which has not yet applied to all of the processors 46 and which must thus be carried over or applied later. In carrying out this function, 76, the database 42 will of course be locked and unlocked at appropriate times as illustrated by the "locked" and "unlocked" legends associated with block 76.

Turning now to FIG. 5, this flow diagram represents the representative steps in an ADJTIME function which must be desirably performed to effect the actual adjustments in time in accordance with the invention. In other words, after the user has made a request in the form of a system call to adjust time which has been processed in accordance with the flow diagram of FIG. 4, next the actual functions for adjusting time must be executed in accordance with the flow such as that illustrated in FIG. 4.

As previously described with reference to the specific example and the tables, the system must determine which of the processors 46 has gone the furthest in applying the previous time delta and is thereby the most advanced. The database 42 will accordingly be processed in order to determine this. It is important to note that the process is actually a two-step process, however, in that once the particular processor has been identified which has advanced the most, in a second pass through the database 42, the elements in the data structures 42A are examined to determine how the time deltas for each of the processors correspond to that of the thus-determined most-advanced processor. A general concept of the invention is that once this difference in time deltas between the most advanced processor and the others is determined, the difference therebetween with respect to each processor is applied to that particular processor's PREV_DELTA, and represents what must be done in order to catch that processor up. It is important to note that this determination relatively of which processor's clock is the most advanced and the magnitude of the difference is applied on a per processor basis for each processor in the system when examining the data structures 42A for each time adjustment request.

Continuing with the flow diagram of FIG. 5, in actually adjusting the time on a per processor basis, it is first necessary to identify the particular processor 46 for which calculations are to be made. Accordingly, the id of the particular processor is determined as an index into the database, shown at block 78. Next, for reasons mentioned regarding contention, when the database 42 is being accessed for purposes of a given processor, a global lock is obtained, 80, while calculations are made and data accessed relative to the particular processor.

Next, shown at block 82, a threshold determination will be made if the particular processor for which the process of FIG. 5 is being executed is caught up, 82. This would be reflected by the TIME_DELTA and PREV_DELTA parameters for the particular processor being zero, shown at block 82, whereupon the system returns, 84.

Continuing with FIG. 5, if on the other hand the TIME_DELTA and PREV_DELTA values for a given processor are not both equal to zero, the process continues to exit from the right of block 82. Next, for the given processor, its corresponding value for PREV_DELTA is determined from the database, shown at block 86. The concept represented by this block 86 is that at this point given that the TIME_DELTA and PREV_DELTA are both non zero, the system is going to either apply a TIME_DELTA based value or a PREV_DELTA value. If, in examining the database, for the particular processor there is no PREV_DELTA reflected, the system will execute the functions illustrated at block 90 to apply the TIME_DELTA. The clock is updated to a NEWTIME and the value written back out as the current clock value plus the user-specified value of USDELTA. The user-specified clock update value is then subtracted from the previous TIME_DELTA value for the processor in the database and this new value for the TIME_DELTA is written back into the database as TIME_DELTA=TIME_DELTA−USDATA. The TIME_DELTA is then set back to zero, the database unlocked, and a return issued.

If, for a given processor, a non-zero PREV_DELTA value has been retrieved in examining the data structures of the database, the processor will apply the thus-determined PREV_DELTA value in updating the clock for that particular processor, shown at block 88. Again, the clock will be read, updated and saved off reflecting a NEWTIME=CLOCK+USDELTA. Again, after writing the NEWTIME, the PREV_DELTA, is set equal to zero, the database 42 unlocked, and a return issued.

The preferred embodiment illustrated is implemented with a UNIX operating system and accordingly it is helpful to understand in a little more detail how timing is handled in such systems. Conventionally, memory-mapped time variables are employed to effect interrupts on a predetermined basis such as 0.01 times per second which essentially would be the smallest unit of time that an application could see moving forward without directly accessing hardware registers. On such systems, when it is necessary to adjust the clocks, it is conventional to do so by applying a small delta over a large period of time and to do so on a clock tick basis, i.e., to apply periodically (such as on the 0.01 second intervals) time adjustments that are a fraction of the overall desired time adjustment or increment.

If an attempt was made to apply a large negative delta in order to set time back, this may cause the problems arising from the fact that for example, applications expect time to be moving forward. Accordingly, as previously noted, this problem has been obviated by applying differing small fractions of the overall desired time adjustment over multiple clock ticks whereby time continues to appear moving forward with respect to each processor but at different relative rates, thereby essentially affording the ability to cause one processor catch up with another without the undesirable effect of time appearing to be moved backward.

Another aspect of time management (employed in the embodiment to be described) is to provide for two or more rates of adjustment to a clock, depending upon the magnitude of the desired adjustment. It will be readily appreciated that if the clocks in an MP system are off by a relatively large amount such as one hour, it may be undesirable to have to spread such a large adjustment over a long period of time. Accordingly, in such a case, a larger time adjustment may be utilized at each clock tick, but nevertheless such adjustments still remaining a fraction of the time interval between the 0.01 clock ticks and a fraction of the overall desired adjusted time. Alternatively, however, for smaller adjustments, a small rate value may be employed as desired for smaller magnitudes for overall adjustment. In the system hereinafter described in accordance with the invention, in a preferred embodiment four rates of time for adjustment may even be provided for: (90%, 100%, 110%, and 150% of normal time progress rate).

While the invention has been shown and described with reference to particular embodiments thereof, it will be understood by those skilled in the art that the foregoing and other changes in form and detail may be made therein without departing from the spirit and scope of the invention.

I claim:

1. A method for updating system time having a sequence of clock ticks in a multiprocessor system comprised of a plurality of processors with corresponding clocks, comprising:

defining TIME_DELTA variables for each of said clocks;
defining TIME_PREVIOUS variables for each of said clocks;
specifying a first time adjustment to said system time;

invoking a first system call to propagate said first time adjustment to said clocks;

specifying a second time adjustment to be made to said system time;

invoking a second system call to propagate said second time adjustment to said clocks;

determining which of said clocks is a furthest advanced clock;

determining the time required for each of said clocks other than said furthest advanced clock to equal said furthest advanced clock;

storing, for each of said clocks other than said furthest advanced clock, respective values corresponding to said determining of time;

applying said respective values to each respective said clock other than said furthest advanced clock; and updating respective ones of said TIME_DATA variables for each of said clocks with said second time adjustment.

2. The method of claim 1 wherein said TIME_PREVIOUS variables correspond to time to be applied to a clock of one of said processors to cause said time to equal time of a clock of a next one of said processors.

3. The method of claim 2 wherein said first time adjustment is user defined.

4. The method of claim 3 wherein said first system call is an ADJTIME call.

5. The method of claim 4 wherein said second time adjustment is user-defined.

6. The method of claim 5 wherein said second system call is an ADJTIME call.

7. The method of claim 6 wherein said step of determining which of said clocks is a furthest advanced clock includes reading said TIME_DELTA variables corresponding to each of said clocks.

8. The method of claim 7 wherein said step of determining the time required for each of said clocks other than said furthest advanced clock to equal said furthest advanced clock is made as a function of said determining of which of said clocks is a furthest advanced clock.

9. The method of claim 8 wherein said step of storing respective values corresponding to said determining of said time comprises storing said respective values in said TIME_PREVIOUS variables.

10. The method of claim 9 wherein said step of updating respective ones of said TIME_DELTA variables is upon occurrence of a next-to-occur one of said clock ticks.

11. The method of claim 10 wherein said updating of said respective ones of said TIME_DELTA variables is with said ADJTIME call.

12. A system for updating system time having a sequence of clock ticks in a multiprocessor system comprised of a plurality of processors with corresponding clocks, comprising:

means for defining TIME_DELTA variables for each of said clocks;

means for defining TIME_PREVIOUS variables for each of said clocks;

means for specifying a first time adjustment to said system time;

means for invoking a first system call to propagate said first time adjustment to said clocks;

means for specifying a second time adjustment to be made to said system time;

means for invoking a second system call to propagate said second time adjustment to said clocks;

means for determining which of said clocks is a furthest advanced clock;

means for determining the time required for each of said clocks other than said furthest advanced clock to equal said furthest advanced clock;

means for storing, for each of said clocks other than said furthest advanced clock, respective values corresponding to said determining of time;

means for applying said respective values to each respective said clock other than said furthest advanced clock; and means for updating respective ones of said TIME_DATA variables for each of said clocks with said second time adjustment.

13. The system of claim 12 wherein said TIME_PREVIOUS variables correspond to time to be applied to a clock of one of said processors to cause said time to equal time of a clock of a next one of said processors.

14. The system of claim 13 wherein said first time adjustment is user defined.

15. The system of claim 14 wherein said first system call is an ADJTIME call.

16. The system of claim 15 wherein said second time adjustment is user-defined.

17. The system of claim 16 wherein said second system call is an ADJTIME call.

18. The system of claim 17 wherein said means for determining which of said clocks is a furthest advanced clock includes means for reading said TIME_DELTA variables corresponding to each of said clocks.

19. The system of claim 18 wherein said means for determining the time required for each of said clocks other than said furthest advanced clock performs said determining as a function of said means for determining which of said clocks is a furthest advanced clock.

20. The system of claim 19 wherein said means for storing respective values corresponding to said determining of said time comprises means for storing said respective values in said TIME_PREVIOUS variables.

21. The system of claim 20 wherein said means for updating respective ones of said TIME_DELTA variables performs said updating upon occurrence of a next-to-occur one of said clock ticks.

22. The system of claim 21 wherein said means for updating of said respective ones of said TIME_DELTA variables performs said updates with said ADJTIME call.

23. A method for maintaining multiple clocks in a multiprocessor system comprised of a plurality of processors each having a respective one of said clocks, comprising:

determining which of said clocks is the most advanced clock in time;

determining time differences between a time corresponding to said most advanced clock and time corresponding to remaining ones of said clocks;

storing said time differences as TIME PREVIOUS fields in a database; and updating time of said remaining ones of said clocks as a function of respective ones of said TIME PREVIOUS fields, wherein said updating is asynchronous on a per-processor basis.

24. A system for maintaining multiple clocks in a multiprocessor system comprised of a plurality of processors each having a respective one of said clocks, comprising:

means for determining which of said clocks is the most advanced clock in time;

means for determining time differences between a time corresponding to said most advanced clock and time corresponding to remaining ones of said clocks;

means for storing said time differences as TIME PREVIOUS fields in a database; and means for updating times of said remaining ones of said clocks as a function of respective ones of said TIME PREVIOUS fields, wherein said updating is asynchronous on a per-processor basis.

* * * * *